March 8, 1960     W. C. JOHNSON     2,927,990
SUBMERGED ARC WELDING
Filed Aug. 12, 1955
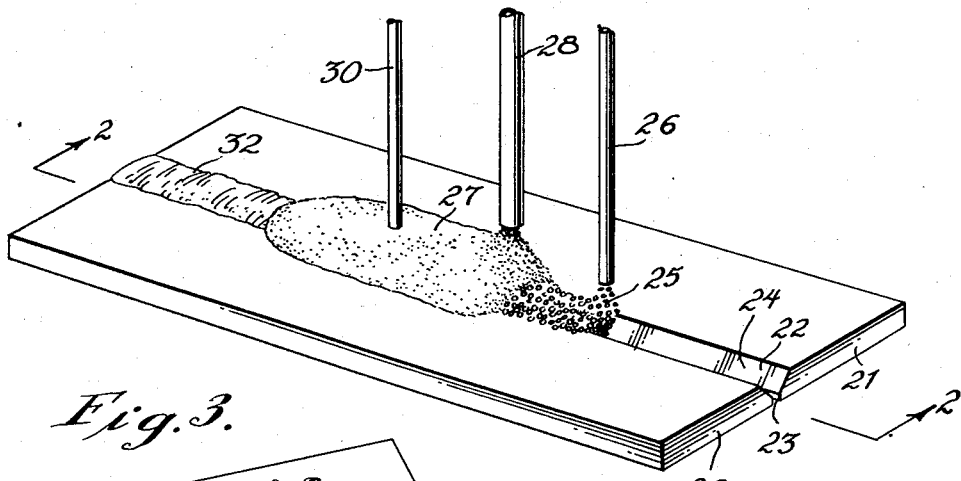
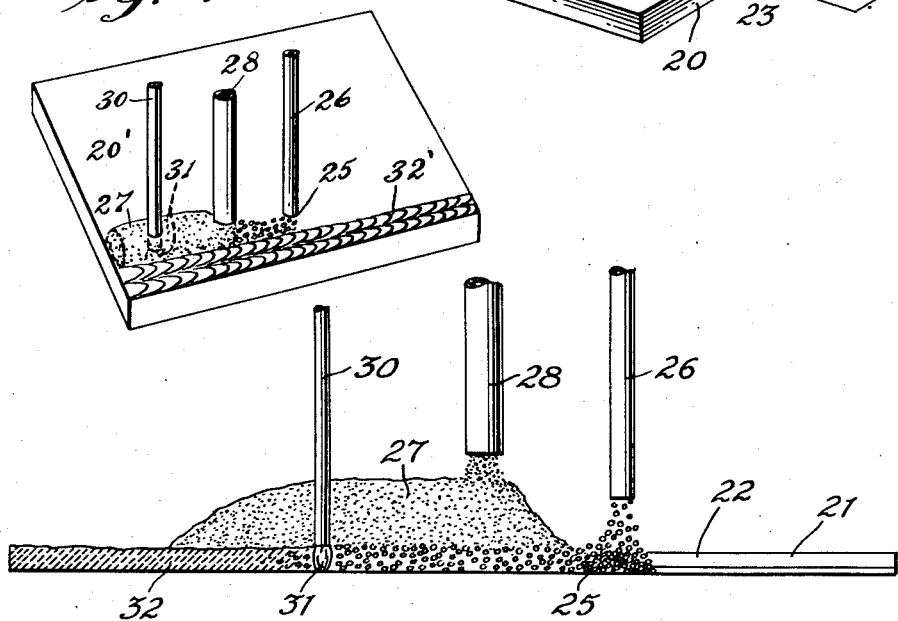
INVENTOR.
WALLACE C. JOHNSON
BY
ATTORNEYS.

United States Patent Office 2,927,990
Patented Mar. 8, 1960

2,927,990
SUBMERGED ARC WELDING

Wallace C. Johnson, St. Davids, Pa., assignor to Arcos Corporation, Philadelphia, Pa., a corporation of Pennsylvania Application August 12, 1955, Serial No. 528,045

10 Claims. (Cl. 219—73)

The present invention relates to submerged arc welding.

A purpose of the invention is to build up high alloying contents in a submerged arc weld at a lower cost.

A further purpose is to avoid having the arc climb up to the top of the flux pile in submerged arc welding, using a high alloy flux.

A further purpose is to introduce alloying ingredients in a submerged arc weld from a separate source comprising particles of alloying ingredients, which is initially deposited at the bottom of the weld groove or on the work surface and is covered by a protective flux layer of different composition.

A further purpose is to use an alloying ingredient layer of higher specific gravity than that of the protective flux layer.

Further purposes appear in the specification and in the claims.

In the drawings I have chosen to illustrate two only of the numerous embodiments in which this invention may appear, selecting the forms shown from the standpoints of convenience in illustration, satisfactory operation and clear demonstration of the principles involved.

Figure 1 is a fragmentary perspective of a welding operation being carried on in accordance with the invention.

Figure 2 is a longitudinal section through the weld of Figure 1, the section being taken on the line 2—2 of Figure 1.

Figure 3 is a perspective showing the invention applied to cladding.

Describing in illustration but not in limitation and referring to the drawings:

It is often desirable in welding to obtain a substantially higher alloying content in the weld from that present in the plate or other weld member and also higher than that present in the welding wire.

In the past, when welding with bare wire and an accompanying flux, in some cases an effort has been made to incorporate the required amount of alloy in the wire. The procurement of a welding wire having sufficient alloy content is difficult and expensive, as a large number of different analyses are now required.

It is often desirable to impart at least part of the alloying content through the flux, and alloying ingredients have been incorporated in granular flux employed in submerged arc welding in the past. As the content of alloying ingredient in the flux increases, however, there is a tendency for the arc to climb up on top of the flux pile, since the added metallic content thus makes the flux highly conductive. This of course is very undesirable and the benefit of submerging the arc by the flux is lost when this occurs.

I have discovered that large amounts of alloying ingredients may be introduced by an auxiliary flux, thus permitting use of bare low cost welding wire, which is without alloy content, or of too low alloy content, and without danger of arcing from the top of the flux pile, if a separate layer of granular alloying material is employed at the bottom of the welding groove under the normal flux blanket.

Thus the weld absorbs the desired alloy from this alloying ingredient layer which is next to the work surface, and the arc occurs from the top of this layer, but the alloying ingredient layer is at all times covered by a normal protective flux such as a lime-silica flux so that the benefit of submerged arc welding is fully obtained.

In order to produce the granular alloying material, I use finely ground alloying ingredients such as ferrochrome, ferrosilicon, ferromanganese, ferrovanadium, ferromolybdenum, and powdered nickel as required. It will be understood that the question of whether the alloying ingredient is used as a ferroalloy or some other alloy or as the metal itself will depend largely on cost and availability.

These finely divided powders are mixed in suitable proportions to give the desired amount of alloying ingredient in an agglomerate. The particles are then cemented together using for example sodium silicate as a bond, and the bonded mass is broken down by grinding or otherwise to produce round agglomerated particles of suitable size, desirable through 10 mesh and on 50 mesh per linear inch.

The following examples show proportions of alloying ingredients and of the bond used for various compositions of the alloying layer:

75 to 30% of chromium, in powdered form (all through 100 mesh) added to 10 to 50% of sodium silicate (60% of which is water) (the balance being a flux of the character of the protective flux mentioned below) agglomerated into small balls, all through 10 mesh, will produce under an arc a 15 to 25% chromium-iron deposit, when welding with a mild steel wire.

Likewise 30 to 20% of silicon powder in 10 to 50% of this sodium silicate (the balance being a flux of the character of the protective flux mentioned below) will form a high silicon-iron deposit of 14% silicon.

It will be evident that the round particles of agglomerate consist of many of the fine particles of alloying ingredient bonded together. The bond is suitably allowed to set by drying, and is then baked to drive off all free water.

I also produce or obtain a protective flux of any well known character which forms a blanket over the alloying layer. The following table sets forth by way of example the maximum, minimum, preferred maximum, preferred minimum and most desirable percentages of ingredients in the protective flux blanket:

| Ingredient | Maximum | Minimum | Preferred Maximum | Preferred Minimum |
|---|---|---|---|---|
| CaO | 50 | 5 | 30 | 20 |
| SiO$_2$ | 70 | 5 | 43 | 33 |
| MgO | 25 | 5 | 14 | 10 |
| Al$_2$O$_3$ | 30 | 5 | 12 | 8 |

The ultimate particles of protective flux are desirably in the range of particle size between 14 mesh and 100 mesh per linear inch, and the oxide particles may be bonded together with 10 to 40 percent of a bond such as sodium silicate of which 57% can be water.

The drawings in Figures 1 and 2 illustrate for example two steel plates 20 and 21 formed at the ends to produce a welding groove 22 having spaced lips 23 and upwardly widening shoulders 24.

A layer 25 of particles of alloying ingredients agglomerated into small balls so as to flow through the tube are deposited in the bottom of the groove preferably from a discharge nozzle 26. Over the top of the layer 25 a layer 27 of protective flux, suitably a lime-silica flux as above mentioned, is deposited desirably from a nozzle 28.

An arc is established between the plates 20 and 21 on the one hand and a suitably bare welding wire 30 on the other hand, as well known in submerged arc welding practice, the arc 31 being maintained beneath the protective flux, and the wire 30 desirably being held vertical or slightly inclined at a bottom level adjoining the top of the alloying ingredient layer. Thus a continuous weld pass 32 is deposited.

It will be evident that the bottom layer 25 consisting almost entirely of metal will be relatively heavy as compared to the protective layer 27, and this feature is desirable as it assures that the bottom layer will stay flat under the arc and will not mix with the top blanketing layer.

The thickness of the bottom layer will vary with the installation, but in many cases the bottom layer 25 will have a thickness of ⅛ to ¼ inch and a width of approximately 1 inch maximum.

The protective or blanketing flux layer is likely to have a thickness of the order of ¾ inch or at least three times that of the alloying ingredient layer.

By raising the voltage as desired, the length and width or fan-shape of the arc can be adjusted to include all of the alloying ingredient layer in the arc stream. Thus by this technique a mixing action similar, but on a smaller scale, to that in an electric furnace is produced so that the alloying ingredient layer is melted and thoroughly distributed in the weld along with a good portion of the base or parent metal.

The principles of the invention may be applied to cladding on a base metal as shown in Figure 3. In this case following a procedure similar to that of Figures 1 and 2, weld beads 32' are applied on a metallic plate 20'.

The action is very quiet since the alloying ingredient layer is fully covered by the normal submerged arc flux. Therefore from the standpoint of outward appearance the operation looks very similar to standard submerged arc welding.

In a typical example, a mild steel wire 5/32 inch in diameter, AISI 1010, was used to form a single bead on carbon steel SAE 1020 plate. The current used was 460 amperes, straight polarity, with a voltage of 30 volts and a speed of progression of the weld of 14 inches per minute. The composition of the alloying ingredient layer was as follows:

70% of ferrochrome:
   70% chrome
   30% iron
30% of sodium silicate containing 57% $H_2O$ The composition of the protective flux blanket layer was as follows:

| | Percent |
|---|---|
| CaO | 43 |
| $SiO_2$ | 32 |
| $Al_2O_3$ | 8 |
| MgO | 9 |
| $CaF_2$ | 4 |

The resulting bead had good structural formation, was free from porosity and had the smooth appearance of a stainless steel weld. Chips cut on a lathe from the surface of the bead and analyzed showed a chromium content of 19.8 percent by weight. Thus the chromium content was built up from zero to nearly 20 percent by this technique.

Since by this method only a portion of the total flux used must be of high alloy content, the over-all flux cost is less than that of a flux which contains alloy distributed throughout. Furthermore by this method it is possible to add greatly increased alloying additions without the difficulty of having the arc jump to the top of the flux pile. It will of course be evident that where the flux is automatically applied as by submerged arc welding mechanism the nozzles 26 and 28 will move ahead of the welding wire 30 in the progression of the arc, each adjusted to the required height above the work.

It will further be evident that it is no longer necessary to fully control the composition of the flux in order to control the alloying addition, since the alloy pick up by the weld can be adjusted by changing the size and height of the nozzle 26 or the relative proportion of alloying ingredient layer which is deposited along with the voltage used so that the same alloying layer material can serve to produce welds of different alloy composition.

It will be evident that the ferroalloy layer is considerably more dense than the protective flux layer.

In view of my invention and disclosure, variations and modifications to meet individual whim or particular need will doubtless become evident to others skilled in the art, to obtain all or part of the benefits of my invention without copying the process and composition shown, and I, therefore, claim all such insofar as they fall within the reasonable spirit and scope of my claims.

Having thus described my invention, what I claim as new and desire to secure by Letters Patent is:

1. The process of submerged arc welding a metallic element or elements adjoining a weld space, which comprises depositing in the bottom of the weld space against the metallic element or elements a layer of granules of alloying ingredients, depositing over the alloying ingredient layer a layer of particles of a welding flux, progressing a metallic welding wire longitudinally of the space in spaced relation to the metallic element or elements and maintaining a submerged arc from the welding wire to the metallic element or elements through the layer of alloying ingredients while the layer of alloying ingredients is covered by the layer of welding flux.

2. The process according to claim 1, in which the layer of alloying ingredients and the layer of welding flux are applied in succession ahead of the wire as the wire advances.

3. The process according to claim 1, in which the alloying ingredient layer is of a higher specific gravity than the welding flux layer.

4. The process according to claim 1, in which two metallic elements come together to form a weld groove in which the weld is deposited.

5. The process according to claim 1, in which the weld is deposited as a cladding layer on a metallic element.

6. The process of submerged arc welding of a metallic element or elements adjoining a weld space, which comprises depositing in the weld space a layer of granules of welding flux and separate granules of alloying ingredients, the granules of alloying ingredients being of higher specific gravity than those of welding flux, and maintaining a submerged arc between a metallic welding wire and the metallic element or elements under the flux to deposit a weld including the fused welding wire incorporating the alloying ingredients.

7. The process according to claim 6, which comprises maintaining the submerged arc through the layer of alloying ingredients.

8. The process according to claim 6, which comprises regulating the thickness of the layer of alloying ingredients to predetermine the alloy pick-up by the weld.

9. The process according to claim 6, in which two metallic elements come together to form the weld space in which the weld is deposited.

10. The process according to claim 6, in which the weld is deposited as a cladding layer on a metallic element.

References Cited in the file of this patent
UNITED STATES PATENTS

| | | |
|---|---|---|
| 2,175,607 | Kinkead | Oct. 10, 1939 |
| 2,191,469 | Hopkins | Feb. 27, 1940 |
| 2,241,572 | Armstrong | May 13, 1941 |
| 2,326,865 | Kennedy | Aug. 17, 1943 |
| 2,427,350 | Carpenter et al. | Sept. 16, 1947 |
| 2,511,976 | Frost | June 20, 1950 |
| 2,531,005 | Smith | Nov. 21, 1950 |
| 2,803,740 | Hyink | Aug. 20, 1957 |

FOREIGN PATENTS

| | | |
|---|---|---|
| 1,142,934 | France | Apr. 8, 1957 |